May 26, 1942.  A. R. KLIGMAN  2,284,615
VALVE FOR HYDRAULIC POWER-TRANSMISSION SYSTEMS
Filed Aug. 8, 1939   3 Sheets-Sheet 1
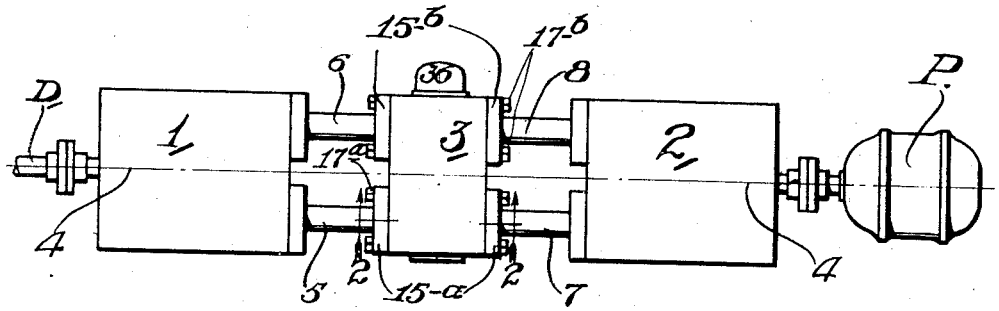
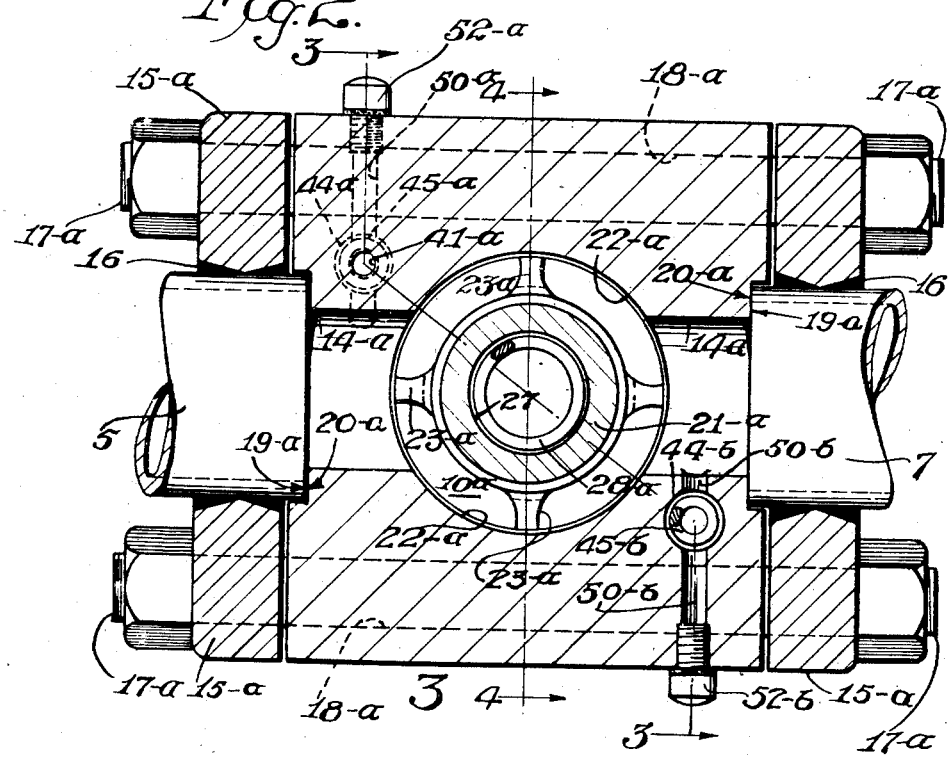
INVENTOR.
Aaron R. Kligman
BY Leonard L. Kalish
ATTORNEY.

May 26, 1942.  A. R. KLIGMAN  2,284,615

VALVE FOR HYDRAULIC POWER-TRANSMISSION SYSTEMS

Filed Aug. 8, 1939  3 Sheets-Sheet 2

Fig. 3.

INVENTOR.
Aaron R. Kligman
BY
Leonard L. Kalish
ATTORNEY.

May 26, 1942.  A. R. KLIGMAN  2,284,615
VALVE FOR HYDRAULIC POWER-TRANSMISSION SYSTEMS
Filed Aug. 8, 1939  3 Sheets-Sheet 3

INVENTOR.
Aaron R. Kligman
BY
Leonard L. Kalish
ATTORNEY.

Patented May 26, 1942

2,284,615

UNITED STATES PATENT OFFICE 2,284,615

VALVE FOR HYDRAULIC POWER-TRANSMISSION SYSTEMS

Aaron R. Kligman, Philadelphia, Pa.

Application August 8, 1939, Serial No. 288,919

9 Claims. (Cl. 277—20)

The present invention relates to hydraulic power transmission systems, and it relates further to automatic relief means in variable speed hydraulic transmission systems, particularly of the closed circuit type, wherein two fluid motor-pump units (preferably of the positive displacement type or piston type) are interconnected in a closed liquid circuit, one motor pump unit being generally driven by or connected to an outside source of power, such as an electric motor or a prime mover or internal combustion engine or the like, and wherein the other fluid motor pump unit is connected to the object to be driven at variable speeds, and wherein the variable speed ratio or variable mechanical ratio between the two fluid motor-pump units is obtained either by varying the effective displacement of one or the other or both of the fluid motor-pump units or by variably by-passing the fluid around one or the other of the fluid motor-pump units.

Referring to the drawings in which like reference characters indicate like parts, Figure 1 represents a schematic or diagrammatic representation of a hydraulic power transmission system embodying my present invention.

Figure 2 represents a section on line 2—2 of Figure 1 on a much enlarged scale.

Figure 3 represents a section on line 3—3 of Figure 2, on a similarly enlarged scale.

Figure 4:
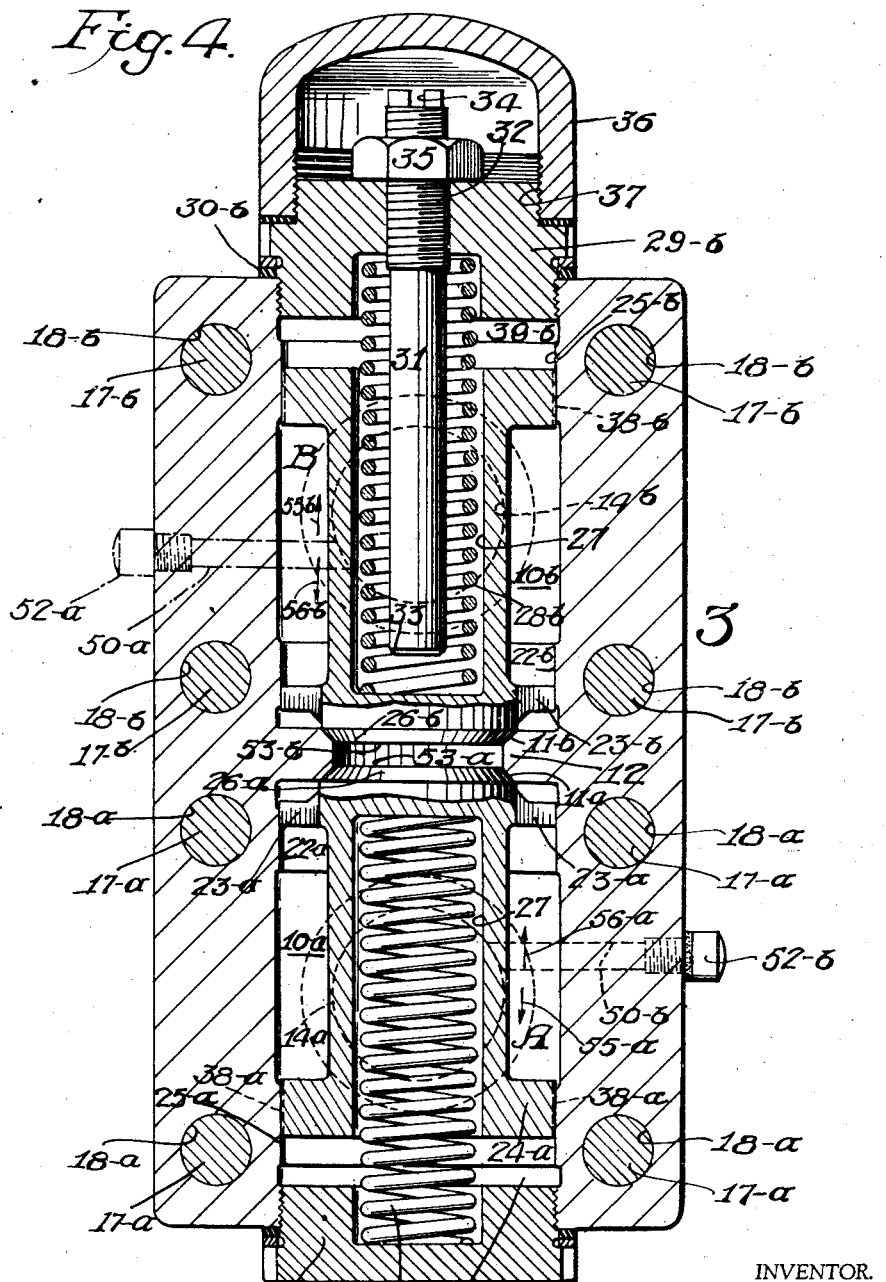
Figure 4 represents a section on line 4—4 of Figure 2.

In the hydraulic power-transmission system of the present invention, a pair of liquid motor-pump units 1 and 2 are interposed between the prime mover P and the drive shaft D of the mechanism to be driven at variable speeds. The prime mover P may be an electric motor as indicated at Figure 1, or it may be an internal combustion engine, steam engine or any other source of power. The drive shaft D may be the drive shaft of any machine or mechanism required to be driven at variable speeds, such as the elevating mechanism of a naval gun or a land battery or any other drive shaft requiring to be driven at gradually variable speeds over the entire speed range.

The liquid motor-pump units 1 and 2 are arranged in a closed circuit by means of pipes 5, 6, 7 and 8 and the valve housing member 3; the pipes 5 and 6 being capable of acting alternately as the intake or exhaust pipes for the liquid motor 1, while the pipes 7 and 8 being capable of acting alternately as intake or exhaust lines for the liquid pump 2. Thus, for instance, when the prime mover P is driving the shaft D in one direction, the pipes 6 and 8, which together are collectively designated as "line B," may constitute the pressure line delivering the power-transmitting fluid under pressure from the motor-pump unit 2 to the motor-pump unit 1, while the pipes 5 and 7, which are here collectively designated as "line A," then constitute the return line or low-pressure line through which the exhaust fluid from the motor-pump unit 1 is returned at a comparatively lower pressure to the intake of the motor-pump unit 2. On the other hand, however, when the shaft D is in effect the driving shaft, and as for instance when a load on a hoist or winch is permitted to be lowered by gravity, then the motor-pump unit 1 will be the driving unit and the motor-pump unit 2 will be the driven unit, when the direction of rotation of the prime mover "P" is reversed, under these conditions the "line A" is the power-transmitting or high-pressure line while the "line B" is the return line or low-pressure line.

The liquid motor-pump units 1 and 2 indicated diagrammatically in Figure 1 may be any of the positive displacement type liquid motors either of the multi-piston type or of any other positive displacement type capable of acting as a motor when fluid-driven, and capable of acting as a pump when driven through its shaft by some other prime mover. Motor-pump units 1 and 2 may be of the type in which a number of cylinders and pistons are arranged around the drive shaft axis 4 with their axes parallel to said drive shaft axes and generally equidistant therefrom, and wherein the displacement of the liquid motor-pump unit in relation to the speed of rotation of the drive shaft thereof may be varied either by varying the effective displacement or stroke of the pistons or by variably by-passing the liquid therefrom, as for instance the type of liquid motor-pump units illustrated in the following United States patents: Robson Patent No. 1,659,374, dated February 14, 1928; Francis Patent No. 1,680,975, dated August 14, 1928; Francis Patent No. 1,785,733, dated December 23, 1930; Ellis Patent No. 1,821,502, dated September 1, 1931; Durner Patent No. 1,867,308, dated July 12, 1932.

In the operative path of each of lines A and B, a similar piston chamber 10—a and 10—b is provided, preferably in axial alignment with each other, and terminating at their inner ends in similar valve seats 11—a and 11—b, respectively, carried by an intermediate partition wall 12, through which the connecting passageway 13 connects the two valve chambers 10—a and 10—b between the two valve seats 11—a and 11—b.

The transverse passageways 14—a and 14—b extend through the housing 3 in communication with the respective valve chambers 10—a and 10—b. To the outer ends of these passageways 14—a and 14—b, the pipes 5 and 7, and 6 and 8, respectively, are connected by any suitable means, as for instance by the bolted coupling flanges 15—a and 15—b, into the apertures of which the pipes 5 and 7, and 6 and 8 may be suitably welded as indicated at 16. The opposite pairs of coupling flanges 15—a as well as the opposite pairs of coupling flanges 15—b are then bolted together by means of bolts 17—a and 17—b, respectively, which extend through similar bolt holes 18—a and 18—b, respectively, in the housing 3. The pipes 5 and 7, and 6 and 8 may have their ends 19—a, which may be ground, held in fluid-tight sealed relation to the recessed surfaces 20—a surrounding the passageways 14—a and 14—b so as to make firm seals between the pipes 5 and 7, and 6 and 8 and the housing 3, or, if desired, suitable sealing gaskets may be interposed.

Within each of the valve chambers 10—a and 10—b, a similar differential piston (21—a and 21—b, respectively) is disposed. Each of the differential pistons 21—a and 21—b is adapted for guided axial displacement. The smaller inner ends of the differential pistons are guided within the cylindrical guiding surfaces 22—a and 22—b by means of the series of circumferentially distributed guide fingers or spokes 23—a and 23—b respectively, while the large outer ends 24—a or 24—b of the pistons fit and ride within the cylindrical portions 25—a and 25—b of the valve chambers 10—a and 10—b respectively.

The small ends of pistons 21—a and 21—b are respectively provided with terminal valve surfaces 26—a and 26—b which are adapted to seat against the corresponding valve seats 11—a and 11—b. Each of the differential pistons is preferably hollowed out as at 27 for receiving the valve-seating springs (28—a and 28—b, respectively) so as to minimize the over-all dimensions of the housing 3. Similar closure plugs 29—a and 29—b are screw threadedly secured in the outer ends of the respective valve chamber 10—a and 10—b with suitable sealing gaskets 30—a and 30—b interposed to make fluid-tight seals. The similar closure plugs 29—a and 29—b also serve as the stationary abutments or anchorages for the outer ends of valve-closing springs 28—a and 28—b. In addition, however, one or both of the closure plugs may also carry an adjustable set-screw or stop-screw 31, which is extended therethrough through threaded hole 32, and the inner end 33 of which serves as an adjustable stop for the differential piston thereby to limit the maximum opening of the valve carried by said differential piston. The set-screw 31 is preferably provided with a slot 34 at its outer end for engagement by a screw driver or may be arranged to receive a wrench. The lock-nut 35 serves to lock the adjustment screw in any setting. A cap 36 is superimposed upon the outer end of the set-screw and the lock nut 35, and is screw-threadedly secured to the closure plug as at 37, in fluid-tight sealed relation to the plug thereby to prevent escape of fluid from the hydraulic transmission system.

One or more peripherally distributed notches 38—a and 38—b may be respectively provided in the outer peripheries of the cylindrical surfaces of the large piston ends 24—a and 24—b. Instead of the peripherally distributed notches 38—a and 38—b, each of the piston-ends 24—a and 24—b may be perforated by suitable small holes of necessary aggregate cross-sectional area (in a direction generally parallel to the axis) so as to secure the same amount of communication between the two sides of the piston-ends 24—a and 24—b. Under all normal conditions of fluid pressure, a complete hydraulic balance will be maintained between the spaces on the opposite sides of the respective piston-ends 24—a and 24—b by reason of the communication established between said spaces (on opposite sides of each of said piston-ends) through the notches 38—a and 38—b or through equivalent holes. Thus, the pressure in each of the valve-chambers 10—a and 10—b will be the same as that in the corresponding pilot-relief chambers 39—a and 39—b respectively.

The pilot-relief chambers 39—a and 39—b are respectively similarly connected, through successive ports or passageways 40—a and 41—a, and 40—b and 41—b to similar pilot relief valve seats 42—a and 42—b, which are respectively closed by ball type or any other suitable type of spring-pressed check valves 43—a and 43—b which respectively act as pilot valves within the valve chambers 44—a and 44—b and are respectively urged by helical compression springs 45—a and 45—b into engagement with the valve seats 42—a and 42—b. The rear or stationary ends of springs 45—a and 45—b respectively abut against corresponding adjustment screws, 46—a and 46—b, which are respectively threaded into the internally screw-threaded passageways 47—a and 47—b formed in continuation of, and in axial alignment with, the valve chambers 44—a and 44—b. The outer ends of the passageways 47—a and 47—b are respectively closed by corresponding screw-threaded closure plugs 48—a and 48—b.

The inner ends of the screws 46—a and 46—b carry stop pins 49—a and 49—b which respectively serve to center the ends of the springs 45—a and 45—b.

By adjusting the screws 46—a and 46—b, the compressions of the springs 45—a and 45—b may be adjusted so as to provide for the opening or unseating of the corresponding pilot check valve balls 43—a and 43—b under any predetermined hydraulic pressures. These are the pressures at which relief is desired in the corresponding lines (A or B) when they constitute the relatively "high-pressure" line. The valve chambers 44—a and 44—b are in turn respectively connected with the opposite main valve chambers 10—b and 10—a through similar passageways 50—a and 50—b so that the relatively higher pressure in either line A or B, which is to be initially relieved through the corresponding pilot valve 43—a or 43—b, is passed right back into the opposite line which at that time is therefore necessarily at a relatively lower pressure.

The outer or free ends of the passageways 41—a and 41—b are suitably closed by screw-threaded closure plugs 51—a and 51—b respectively, while the outer ends of the passageways 50—a and 50—b are also closed by suitable screw-threaded closure plugs 52—a and 52—b respectively.

In operation, the excessive pressure in either line A or B first unseats or opens the corresponding pilot valve 43—a or 43—b, through which some fluid or liquid escapes from the corresponding pilot-relief chamber 39—a or 39—b (which is at the outer side of the corresponding enlarged piston-end 24—a or 24—b) into the opposite line which is at relatively lower pressure. This escape or relief of the high pressure liquid into the low-pressure line, from the outer side of the piston-end 24—a or 24—b (in the then higher pressure line) is at a rate greater than the rate at which the liquid under pressure can be restored from the high-pressure line to the outer side of the piston-end 24—a or 24—b through the bleeder notches or apertures 36—a or 36—b. This causes hydraulic unbalance on opposite sides of the piston-end 24—a or 24—b, with the unbalanced or superior force being in the outward direction 55—a or 55—b. The unbalanced force acting on the piston-end 24—a or 24—b effected in the outward direction 55—a or 55—b is sufficiently great to overcome the force of the corresponding spring 28—a or 28—b which acts in the inward direction 56—a or 56—b, and the unbalanced lower-pressured hydraulic force which is in the corresponding pilot-relief chamber 39—a or 39—b and therefore acts so as to unseat the corresponding bevelled valve 26—a or 26—b. The unseating of the valve 26—a or 26—b permits the excessive pressure of the then high-pressure line to be communicated directly into the space 13 between the two opposed bevelled valves (11—a and 11—b and 26—a and 26—b), so that the excessive high-pressure is thus at once exerted upon the end-surface 53—b or 53—a of the opposed main valve-piston 21—b or 21—a. The higher-pressure fluid coming from the higher-pressure line against the end surface 53—b or 53—a of the piston which is then in the lower pressure line, causes the opposed valve 26—b or 26—a in said lower pressure line to be unseated. Full communication is thereby established between the higher-pressure line and the lower-pressure line so as to tend to equalize the two sufficiently to permit the valves 26—a and 26—b (and the valve-pistons 21—a and 21—b) to be restored to their closed positions.

Thus, as the pressure in the then higher-pressure line so being relieved decreases to a point sufficient to permit its pilot-spring 45—a or 45—b to seat its pilot-valve 43—a or 43—b, the pilot-valve 43—a or 43—b will become seated again and the pressure on opposite sides of the corresponding piston-end 24—a or 24—b will therefore again become equalized, with a result that the corresponding main valve-closing spring 28—a or 28—b will close the corresponding main valve 26—a or 26—b. This in turn permits the main valve-closing spring 28—b or 28—a of the opposed valve 26—b or 26—a to close the opposed valve 26—b or 26—a, thereby restoring all valves to their closed position.

The operation of these two valves is identical regardless of which line happens to be the high-pressure line which is so relieved.

The stop screw 31 is provided to limit the speed of relieving, so that if excessive pressure should develop, the relief of pressure will not proceed at too great a rate. For instance, when hoisting a load, it is important that relieving, when it takes place, be kept reasonably low, so as to prevent the suspended load from dropping too quickly or crashing.

If desired, the valve housing member 3, instead of having its two sides a and b placed directly into the two fluid-conducting pipe lines connecting the fluid motor with the fluid pump (or instead of being placed in "series" in these two lines as shown in Figure 1), may be merely placed "parallel" or "shunted" across the two fluid-conducting lines which interconnect fluid pump and fluid motor. Thus, the a side of the valve housing 3 may have one of its main passageways 14—a connected into one of the two fluid-conducting lines (while the other of its passageways 14—a is closed or plugged up by a solid flange 15—a), while one of the main passageways 14—b of the b side of the valve housing 3 is similarly connected to the other of the two fluid conducting lines (the other passageway 14—b of the b side of the valve housing being likewise closed or plugged up with the solid flange similar to the flange 15—b). In this manner, the fluid through the two fluid-conducting lines between fluid pump and fluid motor may flow throughout the normal operation of the pump and motor without flowing or circulating through the valve housing 3, so that the only flow through the valve housing would take place during periods of relief.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. Duplex relief valve means for closed circuit type of hydraulic power transmission systems or the like, comprising a pair of similar main valve chambers in direct communication with each other, a similar main valve unit slidably disposed within each of said main valve chambers and having a spring associated therewith urging it into a closed position in the direction of the other valve chamber, whereby each of said valve units will tend, at least partially under the influence of its spring, to shut off communication between said two valve chambers, a piston associated with each of said valve units and being slidably fitted within a cylindrical portion formed in continuation of each of said main valve chambers, a restricted by-pass for establishing communication between opposite sides of each of said pistons with a restricted rate of flow through such by-pass, an adjustable stop for limiting the opening one of said main valves, a pair of similar pilot valve chambers each having a spring-pressed check valve therein of an effective hydraulic area substantially less than the effective hydraulic areas of the aforesaid main valves, each of said pilot valve chambers communicating on the spring side thereof with one of said main valve chambers intermediate the main valve and the piston in such main valve chamber and communicating on the other side thereof with the other main valve chamber on the side of the piston therein farthest from the main valve thereof, and a main fluid passageway extending from each of said main valve chambers from a point intermediate the main valve and the piston therein.

2. A duplex relief valve for closed circuit type of hydraulic power transmission systems or the like, comprising a unitary valve housing having therein a pair of similar main valve chambers in direct communication with each other, a similar spring-pressed main valve unit slidably disposed within each of said main valve chambers and having a spring associated therewith urging it into a closed position in the direction of the other valve chamber, whereby each of said valve units will tend, at least partially under the influence of its spring, to shut off communication between said two valve chambers, a piston associated with each of said valve units and being slidably fitted within a cylindrical portion formed in continuation of each of said main valve chambers, a restricted by-pass for establishing communication between opposite sides of each of said pistons with a restricted rate of flow through such by-pass, a pair of similar pilot valve chambers in said housing, each having a spring-pressed check valve therein of an effective hydraulic area substantially less than the effective hydraulic areas of the aforesaid main valves, each of said valve chambers communicating on the spring side thereof with one of said main valve chambers intermediate the main valve and the piston in such main valve chamber and communicating on the other side thereof with the other main valve chambers on the side of the piston therein farthest from the main valve thereof, and two main openings from each of said main valve chambers to the exterior of the housing from a point in such main valve chamber intermediate the main valve and the piston therein.

3. Relief valve means for relieving pressure in excess of a predetermined maximum in either of two bodies of liquid to the other of said bodies of liquid which comprises main piston valve means open each to one of said bodies of liquid and seated so as to prevent flow of liquid into a closed common intermediate chamber, spring means tending to keep said piston valve means seated, each of said piston valve means fitting into a main housing and channels allowing restricted liquid communication with the space back of the piston, pilot valve means between the space in back of the piston and the other body of liquid, said pilot valve opening when the pressure reaches a predetermined maximum, relieving the pressure in the space in back of the piston, and causing the piston to move off its seat and relieve the pressure into the closed intermediate chamber causing the second piston valve means to be forced off its seat, and thereby allowing free communication from one body of liquid to the other, and relief of the excess pressure.

4. Relief valve means for relieving excessive pressure from either of two alternate pressure sources to the other which comprises a pair of oppositely disposed valves, the body of each valve being subject to the pressure of one of the sources, communicating valve seats, a spring associated with each valve and urging it into liquid-tight contact with its valve seat, a piston portion on the opposite end of each valve from the seat and fitting into the valve body, and means to allow leakage, a pilot valve connected to a chamber behind the piston portion, said pilot valve allowing the chamber behind the piston portion to vent when the pressure exceeds a predetermined maximum, and causing the main valve to open.

5. In a relief valve construction, two pressure chambers, means establishing a passageway therebetween, piston valves seating on either side of said passageway establishing means, resilient means normally urging said piston valves to passageway closing position, each of said piston valves including a working area adapted to be acted upon by the pressure in the respective chamber to move the valve in opposition to the resilient means, means defining a closed space behind said piston valves, means establishing communication between said pressure chambers and the respective spaces behind said pistons, and a normally closed pilot valve for relieving the pressure in each of said spaces upon the attainment of a predetermined pressure therein, whereby when the pressure in one of the chambers exceeds the pressure in the other to a predetermined extent the pilot valve opens to create an unbalanced pressure between said chamber and the respective space, whereupon the pressure in said chamber moves said piston valve in opposition to the resilient means to establish communication between said chambers through said passageway.

6. In a relief valve construction, two pressure chambers, means establishing a passageway therebetween, piston valves seating on either side of said passageway establishing means, resilient means normally urging said piston valves to passageway closing position, each of said piston valves including a working area adapted to be acted upon by the pressure in the respective chamber to move the valve in opposition to the resilient means, means defining a closed space behind said piston valves, each space communicating with the other chamber, channels establishing communication between said pressure chambers and the respective spaces behind said pistons, a normally closed pilot valve for relieving the pressure in each of said spaces upon the attainment of a predetermined pressure therein whereby when the pressure in one of the chambers exceeds the pressure in the other to a predetermined extent the pilot valve communicating with the chamber of higher pressure through the channels opens to create an unbalanced pressure between said chamber and the respective space, whereupon the pressure in said chamber moves said piston valve in opposition to the resilient means to establish communication between said chambers through said passageway.

7. In a relief valve construction, two pressure chambers, means establishing a primary passageway therebetween, means establishing secondary communication therebetween, means establishing limited communication between each chamber and the respective secondary communication establishing means, a piston in each chamber partitioning off the chamber from the respective secondary communication establishing means except for the means establishing limited communication, said pistons each including an integral valve for closing said primary passageway, means normally urging said valve to closed position and check valve means in the means establishing secondary communication adapted to be opened upon the attainment of a predetermined pressure therein between the piston and the check valve means, whereby to effect lowering of pressure in the secondary communication establishing means with respect to the chamber so that the piston may be moved hydraulically to unseat the valve closing the primary passageway to permit pressure relief of one chamber into the other.

8. In a relief valve construction, two pressure chambers, means establishing a primary passageway therebetween, piston valves seating on either side of said passageway establishing means, resilient means normally urging said piston valves to passageway closing position, each of said piston valves including a working area adapted to be acted upon by the pressure in the respective chamber to move the valve in opposition to the resilient means, means defining a closed space behind each of said piston valves, secondary passage means normally providing restricted flow between the pressure chambers and the spaces in back of the pistons respectively, by-pass means communicating between the backs of the pistons and the opposite chambers respectively, and valve means in said by-pass means respectively responsive to pressure differences between the backs of said pistons and the opposite chambers.

9. In a relief valve construction, two pressure chambers, means establishing a primary passageway therebetween, piston valves seating on either side of said passageway establishing means, resilient means normally urging said piston valves to passageway closing position, each of said piston valves including a working area adapted to be acted upon by the pressure in the respective chamber to move the valve in opposition to the resilient means, means defining a closed space behind each of said piston valves, secondary passage means normally providing pressure equalization between the pressure chambers and the spaces in back of the pistons respectively, means for restricting the flow through said secondary passages, means for relieving pressure from the backs of said pistons, and valve means in said relieving means responsive to pressures in the backs of said pistons.

AARON R. KLIGMAN.